United States Patent [19]
Maier

[11] Patent Number: 5,746,301
[45] Date of Patent: May 5, 1998

[54] SORTING CONVEYOR FOR PACKETS

[75] Inventor: Willi Maier, Kloten, Switzerland

[73] Assignee: Grapha-Holding AG, Hergiswil, Switzerland

[21] Appl. No.: 555,902

[22] Filed: Nov. 13, 1995

[30] Foreign Application Priority Data

Nov. 16, 1994 [CH] Switzerland ............ 03437/94

[51] Int. Cl.[6] .................................................. B65G 47/46
[52] U.S. Cl. ........................................... 198/370.04
[58] Field of Search ....................................... 198/370.04

[56] References Cited

U.S. PATENT DOCUMENTS

| | | |
|---|---|---|
| 3,147,845 | 9/1964 | Harrison et al. . |
| 3,286,811 | 11/1966 | McWilliams ............ 198/370.04 |
| 3,848,728 | 11/1974 | Leibrick et al. ........ 198/370.04 |
| 4,004,681 | 1/1977 | Clewett et al. . |
| 4,569,434 | 2/1986 | Horii et al. ............. 198/370.04 |
| 5,018,928 | 5/1991 | Hartlepp ................. 198/370.04 |
| 5,477,955 | 12/1995 | Madden et al. .......... 198/370.04 |

FOREIGN PATENT DOCUMENTS

| | | |
|---|---|---|
| 2179902 | 11/1973 | France . |
| C-415773 | 8/1924 | Germany . |
| 1546382 | 2/1990 | U.S.S.R. ................ 198/370.04 |
| 2117341 | 12/1983 | United Kingdom . |
| WO 90/09944 | 9/1990 | WIPO . |

*Primary Examiner*—Joseph E. Valenza
*Attorney, Agent, or Firm*—Spencer & Frank

[57] ABSTRACT

A sorting conveyor for packets is provided with a plurality of carriages circulating along an endless track. Each carriage supports at least one carrier arrangement for the packets which is tiltable at predetermined unloading points. Each carrier arrangement includes a plate which is tiltable in only one direction for unloading and is tensioned in the tilt direction. The plate is supported on the carriage against the tension force by a detachable support arrangement.

8 Claims, 2 Drawing Sheets

SORTING CONVEYOR FOR PACKETS

CROSS-REFERENCE TO RELATED APPLICATION

This application claims the priority of patent application Ser. No. 03,437/94-1 filed on Nov. 16, 1994, in Switzerland, the disclosure of which is incorporated herein by reference.

BACKGROUND OF THE INVENTION

The invention relates to a sorting conveyor for packets, having a plurality of carriages circulating along an endless track, with each carriage supporting at least one carrier arrangement for the packets which is tiltable at predetermined unloading points.

A sorting conveyor of this type is disclosed in International Patent Publication No. WO 90/09944. In this sorting conveyor, each carriage has a carrier plate which is tiltable around a horizontal axis to one or the other side of a track at predetermined unloading points. To tilt the carrier plate selectively, an operating lever is secured on each side of the track below the carrier plate. Each operating lever is provided with a roller at a lower free end, which roller can be fed to a sliding member at the unloading points for the tilting of the carrier plate. An operating lever, which is engaged at its roller by a sliding member, is deflected downwardly and laterally in order to tilt the carrier plate. During this process, the other operating lever, which was not engaged, carries out a corresponding countermovement. The devices needed for the operation and guidance of the aforementioned operating levers are comparatively complex. At the unloading points, the sliding members take up a comparatively long path along the track, which path determines the minimum distance between adjacent unloading points.

SUMMARY OF THE INVENTION

It is an object of the invention to provide a sorting conveyor of the above-mentioned which can be produced at considerably lower cost and which is nevertheless efficient.

The above and other objects are achieved according to the invention by the provision of a sorting conveyor for packets, comprising: a plurality of carriages circulating along an endless track; and carrier arrangements for the packets supported by respective ones of the carriages, each carrier arrangement including: a pivotally mounted plate arranged for being tilted in only one direction at predetermined unloading points; a tensioning device for applying a tension force on the plate in the tilt direction; and a support arrangement for supporting the plate against the tension force and being selectively detachable so that the plate is not supported against the tension force.

In the sorting conveyor according to the invention, only the support arrangement must be detached during unloading at an unloading point, after which the plate or plate section is tilted immediately because of the released tension force. Sliding members at unloading points can thus be deleted and, correspondingly, the spacing between adjacent unloading points can be selected to be considerably shorter than in the past. The simple operation without a sliding member allows the arrangement of several partial plates on a carrier arrangement. For example, if two carrier plates are arranged on each side, two packets can be simultaneously discharged, one each on the left and right side of the track, respectively.

BRIEF DESCRIPTION OF THE DRAWINGS

These and other features and advantages of the invention will be further understood from the following detailed description of the preferred embodiments with reference to the accompanying drawings.

DETAILED DESCRIPTION OF THE PREFERRED EMBODIMENTS

Figure 2:
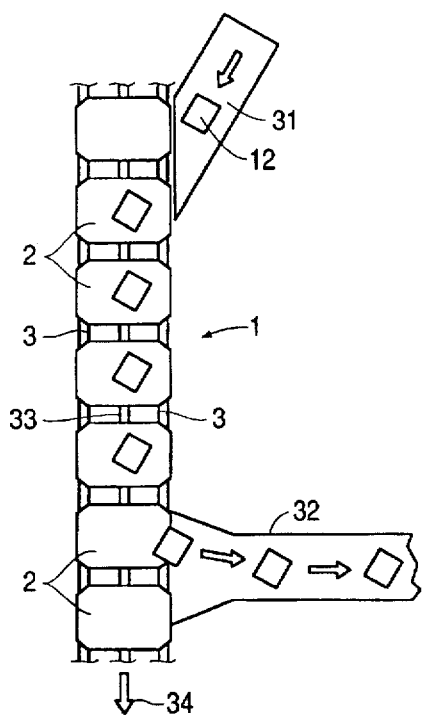
FIG. 2 is a schematic, plan view of a section of the sorting conveyor according to the invention.

Referring to FIG. 2., there is shown a segment of a sorting conveyor 1 that has several carriages 2 which are connected with one another in an articulated manner by means of a drag chain not shown here and which are guided on rails 3. Carriages 2 can be loaded individually with an object 12 by a feeder arrangement 31, which is known per se, and can be unloaded at an unloading point by a discharge arrangement 32. During loading and unloading, carriages 2 are moved, as a rule, without a speed change in the direction of arrow 34. In these applications, the loading and unloading stations are provided with several feeder and transfer arrangements 31 or 32.

Figure 1:
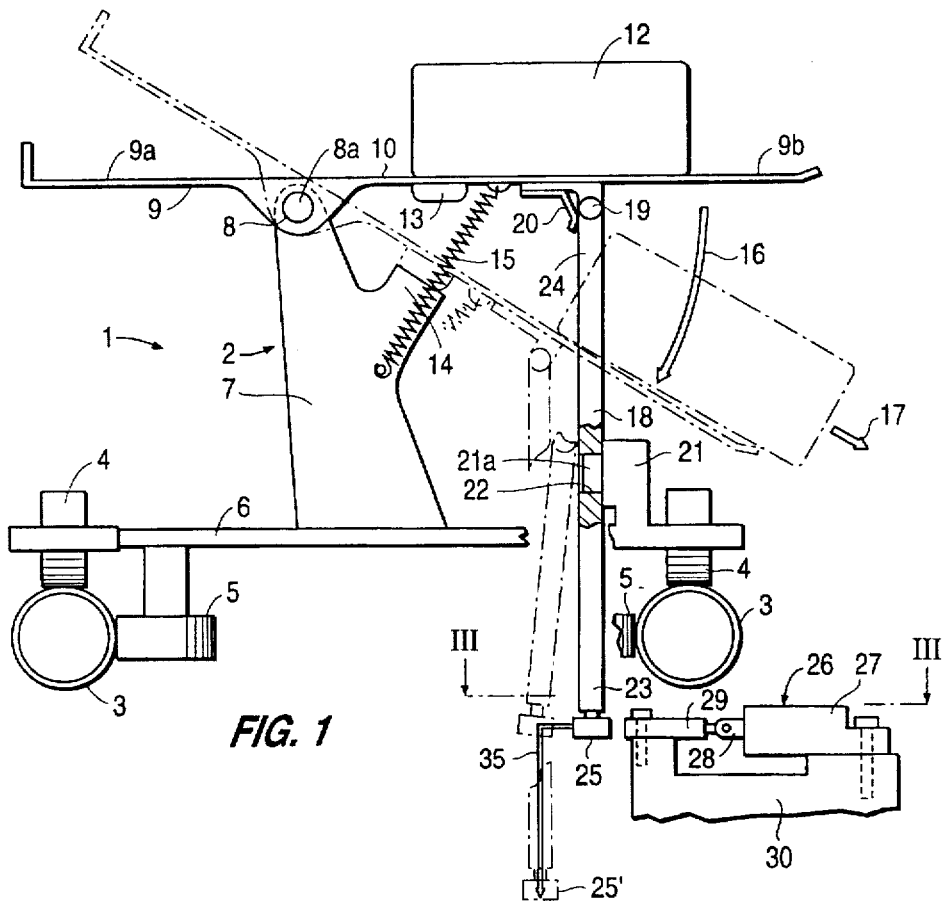
FIG. 1 is a schematic, partial cut view of a sorting conveyor and of a release arrangement at an unloading point according to one embodiment of the invention.

Usually, all carriages 2 have the same configuration. As is shown in FIG. 1, each carriage 2 has a frame 6 at which support rollers 4 and guide rollers 5 are seated, which run on rails 3. Frame 6 is connected to the drag chain. Drives and guides of different configurations for such carriages 2 are well known to the person skilled in the art and are therefore not explained here in any detail.

A support 7 is fixedly arranged on frame 6, with the support having a hinge 8 with a horizontal axle 8a at its upper end. A carrier plate 9 is seated on axle 8a, with, in the view according to FIG. 1, the carrier plate having a region 9a to the left of axle 8a and a larger region 9b to the right of axle 8a. Below carrier plate 9, a leg 18 is articulated approximately in the center of larger region 9b, with the leg being swingable to the left against a repelling force of a leaf spring 20 around a horizontal axle 19. In the vertical position illustrated by solid lines, leg 18 is supported in downward direction on a support 21 which is fixedly attached to frame 6. For this purpose, leg 18 has an opening 22 approximately in its center into which extends a cam 21a. Leaf spring 20, which rests against an upper end 24 of leg 18 below axle 19, holds leg 18 in the mentioned position. In this position, carrier plate 9 is firmly supported against frame 6 and cannot be swung around axle 8a.

The support of leg 18 on cam 21a can be released in that a turning moment is exerted with a short push transversely to the travel direction at a roller 25 which is secured to a lower end 23 of leg 18, after which leg 18 is swung around axle 19 into the position illustrated by dash-dot lines. In this position, cam 21a no longer extends into opening 22 so that leg 18 below axle 19 is no longer supported and is free.

A tension spring 15 is arranged on carrier plate 9 below region 9b, with the spring being connected to carrier plate 9 at an upper end and to support 7 at a lower end. If leg 18 is supported by cam 21a, carrier plate 9 stays in the position illustrated by solid lines and tension spring 15 remains under tension. But if the engagement of cam 21a at leg 18 is released, spring 15 swings carrier plate 9 in the direction of arrow 16 around axle 8a as a result of the tensile force of spring 15 until the carrier plate is in the position illustrated by dash-dot lines in FIG. 1. This final position is determined by a rubber buffer 13 which rests against a side arm 14 of support 17 in the final position. Therefore, a short push against leg 18 suffices, preferably at its lower end, to tilt carrier plate 9. During the subsequent automatic swinging of carrier plate 9, an object 12 disposed on the carrier plate is also swung downward into the position illustrated by dash-dot lines and slides in the direction of arrow 17 away from an upper side 10 of the carrier plate onto a further transport arrangement which is not shown here. If object 12 is heavy, rubber buffer 13 serves as a damper.

Figure 3:
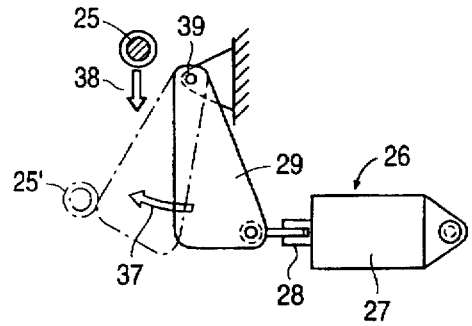
FIG. 3 is a plan view of the release arrangement shown in FIG. 1.

To release the mentioned push on roller 25, a control lever 29 is disposed at the level of the roller according to FIG. 1 on a frame 30 of an unloading station, which lever can be swung, for example, by a cylinder piston unit 26 in the direction of arrow 37. As is indicated in FIG. 3, control lever 29 can be swung at the one end around a swing axle 39 in the direction of arrow 37 into a releasing position illustrated in dash-dot lines. For this purpose, a piston 28 which is articulated on control lever 29 is moved out of its cylinder housing 27. If a carriage 2 now moves in the direction of arrow 38 against the deflected control lever 29, roller 25 of leg 18 runs up against control lever 29 and is deflected into the position illustrated by 25'. Carrier plate 9 is then immediately swung automatically as described above. If operating lever 29 is not swung into the position illustrated by dash-dot lines, roller 25 moves past the operating lever without deflection. In order to swing operating lever 29, a unit 26 is activated via a control which is not shown here.

The tension force of spring 15 is set such that carrier plate 9 is swung quickly, even for a very light object 12. Carrier plate 9 is also swung, even if object 12 is disposed entirely in region 9a. Thus, the swinging of carrier plate 9 takes place largely independently of the weight and the position of object 12 at approximately the same speed. This is essential for the precise transfer of object 12, for example, to a belt which transports the object further, which is not shown here. Thus, object 12 may also be, for example, a light postal letter which rests somewhere on upper side 10 of the plate 9.

Figure 7:
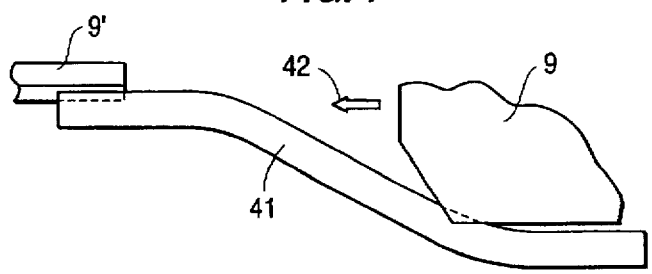
FIG. 7 is a schematic view of a tray reset.

To swing the swung carrier plate 9 back into the horizontal position, for example, a guide rod 41 shown in FIG. 7 is arranged along the track. A swung carrier plate 9 moving in the direction of arrow 42 runs up guide rod 41 and undergoes a force oriented upwardly which brings the carrier plate into a position illustrated by 9'. Such a rod 41 suffices for resetting all of the tilted carrier plates 9.

Figure 4:
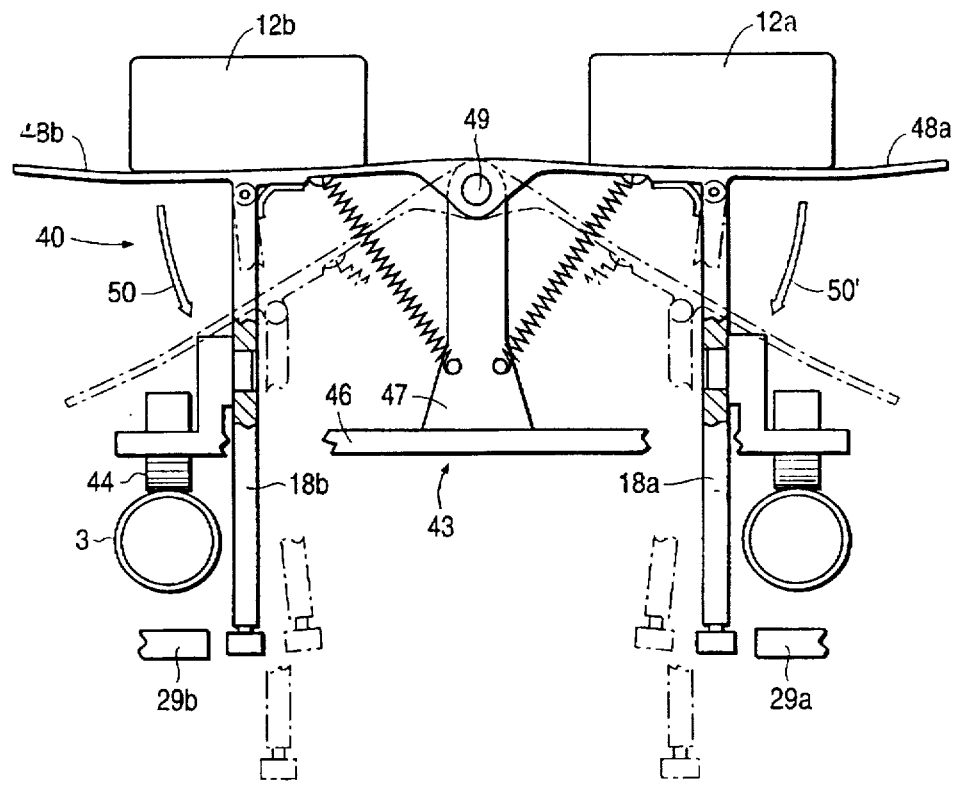
FIG. 4 is a schematic, partial cut view of a sorting conveyor according to another embodiment of the invention.
Figure 5:
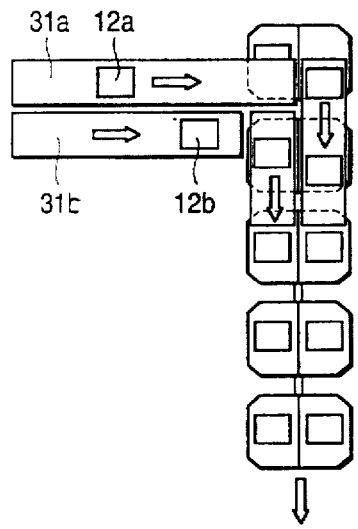
FIG. 5 is a plan view of a sorting conveyor having a carriage according to FIG. 4.
Figure 6:
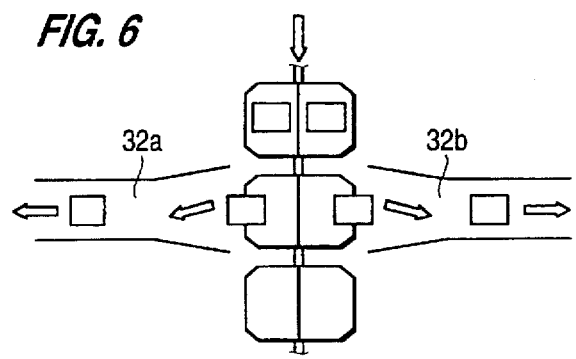
FIG. 6 is a plan view of a further section of the sorting conveyor according to FIG. 5.

Referring to FIGS. 4 to 6, there is shown a modified sorting conveyor 40 according to another embodiment of the invention. Here, each carriage 43 also has a frame 46 which is guided on rails 3 by way of rollers 44 and is driven, for example, by a drag chain. But contrary to the embodiment illustrated in FIGS. 1 to 3, carriage 43 has two plate sections 48a and 48b mounted on a support 47 and which can be swung independently of one another. Carrier plate sections 48a and 48b are seated on a common and horizontal swing axle 49 and can be swung into a position illustrated by dash-dot lines in the direction of arrows 50 and 51', respectively. Approximately in its center, each plate section 48a, 48b is provided with a leg 18a, 18b, respectively, below the plate section, which leg may correspond exactly to the above-mentioned leg 18 in design and function. Control levers 29a and 29b, which are arranged at the unloading points for the swinging of legs 18a and 18b, may also correspond entirely to the above-referenced control lever 29. During the swinging of plate section 48b, an object 12b disposed on this plate section, according to the view of FIG. 4, is discharged toward the left and, during the swinging of plate section 48a, an object 12a is discharged toward the right. According to FIG. 6, objects 12a and 12b may be transferred to oppositely disposed transport arrangements 32a and 32b, simultaneously or sequentially. According to FIG. 5, objects 12a and 12b can be fed from the same side by means of feeder belts 31a and 31b. Of course, feeding from opposite sides of the sorting conveyor is also conceivable. Thus, compared to a carriage having only one carrier plate, the conveying output can be essentially doubled. To reset plate sections 48a and 48b, at least two guide rods 41 are, of course, required which are not shown here.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A sorting conveyor for packets, comprising:

a plurality of carriages circulating along an endless track;

carrier arrangements for the packets supported by respective ones of the carriages, each carrier arrangement including: a pivotally mounted plate arranged for being tilted in only one direction at predetermined unloading points; a tensioning device for applying a tension force on the plate in the tilt direction; a support arrangement including at least one, swingingly mounted, downwardly extending leg, the leg having a first position for supporting the plate against the tension force, the leg being swingable laterally into a second, detached position in which the leg is freely movable in a downward direction;

a frame; and a support fixed to the frame and against which support the leg is supported in the first position, the leg being slidable off the support in a swinging movement away from the support into the second, detached position so that the plate is not supported against the tension force.

2. The sorting conveyor according to claim 1, wherein the tensioning device includes a spring for applying the tension force.

3. The sorting conveyor according to claim 1, wherein each carrier arrangement includes a spring mounted for exerting a repelling force against the leg and the leg has an upper end articulated on an underside of the plate so that the leg can be swung in a direction against the repelling force of the spring.

4. The sorting conveyor according to claim 1, wherein each carrier arrangement includes two plates arranged side by side transversely to a direction of travel of the carriages, the two plates being mounted to be tilted independently of one another in directions opposite to one another and transverse to the travel direction of the carriages.

5. The sorting conveyor according to claim 1, wherein each carrier arrangement includes only one plate which can be tilted to only one side.

6. The sorting conveyor according to claim 1, further including a control arrangement disposed at an unloading point for deflecting the leg into the second, detached position.

7. The sorting conveyor according to claim 6, wherein the control arrangement includes an operating lever which can be swung into a path of a leg for swinging the leg into the second, detached position.

8. The sorting conveyor according to claim 1, wherein the leg has a lower end which is operated on for swinging the leg into the second, detached position.

* * * * *